US012676047B2

(12) United States Patent
Jochemsen

(10) Patent No.: US 12,676,047 B2
(45) Date of Patent: Jul. 7, 2026

(54) HOPPER FOR COLLECTING AND DISPENSING DISCRETE MEDICAMENTS, OUTLET VALVE, DISPENSING DEVICE COMPRISING SAID HOPPER AND METHOD

(71) Applicant: VMI Holland B.V., Epe (NL)

(72) Inventor: Cornelis Jan Jochemsen, Epe (NL)

(73) Assignee: VMI Holland B.V., Epe (NL)

( * ) Notice: Subject to any disclaimer, the term of this patent is extended or adjusted under 35 U.S.C. 154(b) by 224 days.

(21) Appl. No.: 18/291,955

(22) PCT Filed: Jul. 29, 2022

(86) PCT No.: PCT/EP2022/071457
§ 371 (c)(1),
(2) Date: Jan. 25, 2024

(87) PCT Pub. No.: WO2023/007004
PCT Pub. Date: Feb. 2, 2023

(65) Prior Publication Data
US 2024/0249584 A1 Jul. 25, 2024

(30) Foreign Application Priority Data
Jul. 30, 2021 (NL) ..................................... 2028894

(51) Int. Cl.

| | |
|---|---|
| ***G07F 17/00*** | (2006.01) |
| ***B65B 5/10*** | (2006.01) |
| ***B65B 39/00*** | (2006.01) |

(52) U.S. Cl.
CPC .......... *G07F 17/0092* (2013.01); *B65B 5/103* (2013.01); *B65B 39/002* (2013.01)

(58) Field of Classification Search
CPC ... G07F 17/0092; B65B 5/103; B65B 39/002; B65B 39/003
See application file for complete search history.

(56) References Cited

U.S. PATENT DOCUMENTS 6,481,180 B1 * 11/2002 Takahashi ............... B65B 5/103 53/238
6,928,790 B2 * 8/2005 Takahashi ............... B65B 5/103 53/238
(Continued)

FOREIGN PATENT DOCUMENTS

WO 2011/024852 A1 3/2011
WO 2014/171818 A1 10/2014

*Primary Examiner* — Michael Mccullough
(74) *Attorney, Agent, or Firm* — Ipsilon USA-NLO

(57) ABSTRACT

The invention relates to a hopper, an outlet valve, a dispensing device and a method for collecting and dispensing discrete medicaments, wherein the hopper comprises a hopper inlet, a hopper outlet and an outlet valve in the hopper outlet that is movable between a closed position in which the outlet valve blocks passage of the discrete medicaments out of the hopper through the hopper outlet and an open position in which the outlet valve allows passage of the discrete medicaments out of the hopper through the hopper outlet in a drop direction, wherein the outlet valve has a valve body that defines a holding surface at a side of the valve body that supports the discrete medicaments in the hopper outlet when the outlet valve is in the closed position, wherein said holding surface has a cross section for receiving the discrete medicaments.

19 Claims, 8 Drawing Sheets

(56) References Cited

U.S. PATENT DOCUMENTS

| | | | | |
|---|---|---|---|---|
| 7,228,988 | B2 * | 6/2007 | Inamura | G07F 17/0092 221/241 |
| 7,438,201 | B2 * | 10/2008 | Kim | B65B 9/02 221/280 |
| 7,641,073 | B2 * | 1/2010 | Kim | B65B 5/103 221/173 |
| 8,146,777 | B2 * | 4/2012 | Inamura | G07F 17/0092 221/241 |
| 10,173,830 | B2 * | 1/2019 | 'T Lam | G01F 23/292 |
| 10,457,427 | B2 * | 10/2019 | De Boer | B65B 9/045 |
| 12,172,784 | B2 * | 12/2024 | Kim | B65B 5/103 |
| 2002/0162850 | A1 | 11/2002 | Yuyama et al. | |
| 2004/0261357 | A1 | 12/2004 | Takahashi et al. | |
| 2006/0016827 | A1 * | 1/2006 | Hatsuno | G07F 11/24 221/277 |
| 2008/0104929 | A1 | 5/2008 | Kim | |
| 2014/0318078 | A1 * | 10/2014 | Kondo | G16H 20/13 382/141 |

* cited by examiner

HOPPER FOR COLLECTING AND DISPENSING DISCRETE MEDICAMENTS, OUTLET VALVE, DISPENSING DEVICE COMPRISING SAID HOPPER AND METHOD

BACKGROUND

The present disclosure relates to a hopper for collecting and dispensing discrete medicaments, an outlet valve for use in said hopper, a dispensing device comprising said hopper and a method for collecting and dispensing discrete medicaments.

U.S. Pat. No. 10,457,427 B2 discloses an apparatus for dispensing solid substances, wherein the apparatus comprises a feeder section with a plurality of feeder units and a collection section with a plurality of hoppers located below the plurality of feeder units. The plurality of hoppers are rotatable with respect to the feeder units for receiving solid substances from one or more of said feeder units. Each hopper is provided with a hopper outlet for dispensing the solid substances to a packing unit below and a dispensing valve at the hopper outlet that is movable between an open position and a closed position for opening and closing the hopper outlet.

SUMMARY

A disadvantage of the known hopper is that they are part of a circular array of hoppers that is moved in a fast, stepped rotation along the plurality of feeder units. Consequently, the solid substances collected in the hopper outlet are repeatedly subjected to sudden horizontal forces that cause the solid substances to behave unpredictably. In particular, the solid substances tend to bounce off each other and the internal surfaces of the hopper. The discrete medicaments may be damaged as a result.

Moreover, when the dispensing valve is moved to the open position shortly after stepped movement of the respective hopper into a packaging position above the packing unit, some of the solid substances contained in the hopper outlet just above the dispensing valve may still be bouncing and will not fall out immediately. Moreover, the trajectories of the solid substances become unpredictable as a result of the bouncing. Some solid substances may fall outside of the receiving funnel of the packing unit.

Hence, precautionary measures, such as additional sensors or longer waiting times, have to be taken to ensure that all solid substances collected in the hopper are correctly dispensed.

It is an object of the present invention to provide a hopper for collecting and dispensing discrete medicaments, an outlet valve for use in said hopper, a dispensing device comprising said hopper and a method, wherein the reliability of the dispensing of discrete medicaments from the hopper can be improved.

According to a first aspect, a Hopper for collecting and dispensing discrete medicaments is provided, wherein the hopper comprises a hopper inlet, a hopper outlet and an outlet valve in the hopper outlet that is movable between a closed position in which the outlet valve blocks passage of the discrete medicaments out of the hopper through the hopper outlet and an open position in which the outlet valve allows passage of the discrete medicaments out of the hopper through the hopper outlet in a drop direction, wherein the outlet valve has a valve body that defines a holding surface at a side of the valve body that supports the discrete medicaments in the hopper outlet when the outlet valve is in the closed position, wherein said holding surface has a cross section for receiving the discrete medicaments, wherein said cross section is trough-shaped. The hopper further comprises a valve position sensor for detecting the open position and/or the closed position of the outlet valve.

The kinetic energy of the falling discrete medicaments can be absorbed by the downwardly angled or tapering sides of the trough-shaped cross section before the discrete medicaments reach the bottom of the holding surface where they can be supported in a reliable manner prior to dispensing. Hence, the discrete medicaments are less likely to bounce back up from the trough-shaped cross section.

Moreover, the hopper, as part of a circular array of hoppers in a dispensing device rotating along a plurality of feeder positions and/or one or more packing positions, is repeatedly subjected to a fast stepped, sideways movement which can generate both horizontal and centrifugal forces on the discrete medicaments supported on the holding surface. The trough-shaped cross section forms a recessed volume that can receive a plurality of discrete medicaments in a closely packed manner, thereby reducing the chances of the discrete medicaments bouncing off and/or damaging each other. More in particular, the trough-shaped cross section allows the discrete medicaments, urged by the centrifugal force exerted on the rotating circular array of hoppers, to become nested as close as possible to the bottom of the trough-shaped cross section of the holding surface, thereby minimizing or preventing that the horizontal forces exerted on the discrete medicaments with each stepped movement of the hopper cause unpredictable bouncing and/or damage.

Detection of the open position and/or the closed position of the valve by the sensor can provide insight into the correct operation and/or any faults occurring with the outlet valve during the operation. In particular, it can be detected when the outlet valve does not fully return to the closed position, for example because at least part of a discrete medicament is stuck between the outlet valve and the hopper outlet.

The aforementioned technical effects further ensure that the discrete medicaments, at the moment of dispensing, are relatively stationary with respect each other and/or the hopper. As a result, the discrete medicaments can fall uniformly and/or without substantial delay, and in particular with less chances of significant trajectory altering contact between said discrete medicaments.

In one embodiment the outlet valve is rotatable between the closed position and the open position about a valve axis, wherein the cross section is parallel to the valve axis. In other words, the outlet valve can have a trough-shape extending in a direction perpendicular to the valve axis, such that when the outlet valve is rotated towards the open position, the holding surface can drop away from underneath the discrete medicaments in the direction in which the trough-shape tapers.

In a further embodiment the valve body comprises a first half and a second half that converge in the drop direction from opposite sides of a mid-plane. Said halves can effectively deflect the discrete medicaments as they fall towards the lower portion of the holding surface, and absorb kinetic energy of the discrete medicaments along the way.

Optionally, the first half and the second half are symmetrical about said mid-plane. Consequently, the discrete medicaments can behave similarly when contacting any one of the halves.

Additionally or alternatively, the outlet valve is rotatable between the closed position and the open position about a valve axis, wherein the mid-plane extends perpendicular to the valve axis. Again, when the outlet valve is rotated towards the open position, the holding surface can drop away from underneath the discrete medicaments in the direction in which the halves taper.

In a further embodiment the valve body further comprises a valley interconnecting the first half and the second half, wherein the valley extends linearly. The discrete medicaments can be received on the holding surface in a uniform manner, e.g. more or less in a single file, so that they can be dropped more uniformly when the outlet valve is moved towards the open position.

In one particular embodiment the cross section is at least partially V-shaped. The inclined side walls of the V-shaped cross section can effectively deflect the discrete medicaments towards the bottom of the holding surface and/or absorb the kinetic energy of said discrete medicaments.

Alternatively, the cross section is at least partially concave. Like the V-shaped cross section, the concave side walls of the concave cross section may be equally suited for deflecting the discrete medicaments and/or absorbing the kinetic energy thereof.

In another embodiment in the cross section the holding surface has a width and a depth that is at least half the width. The cross section can thus be sufficiently deep or steep to receive a plurality of the discrete medicaments with a reduced chance of the discrete medicaments bouncing back from or out of the volume defined within said cross section.

In another embodiment the holding surface has a longitudinal direction that is at an oblique angle to the horizontal plane when the outlet valve is in the closed position. The oblique orientation of the holding surface can promote the nesting of the discrete medicaments in the trough-shaped cross section thereof, especially under the influence of the aforementioned centrifugal forces experienced during rotation of the array of hoppers. In, particular, the hopper would be positioned in the array of hoppers in such a way that the holding surface is at an obtuse angle or perpendicular to the centrifugal force.

In another embodiment the hopper is provided with a pin, wherein the outlet valve is rotatable about said pin between the closed position and the open position, wherein the outlet valve at the location of the pin is provided with a reinforcement bushing to receive the pin. The reinforcement bushing can increase the lifetime of the hopper by preventing the outlet valve wearing out early and becoming detached from the pin after a period of repeated opening and closing of the outlet valve.

Optionally, the reinforcement bushing has a thickness in an axial direction parallel to the pin that is thicker than valve body directly around said reinforcement bushing. The rest of the valve body does not need to be reinforced because it is not subjected to wear relative to the pin. Hence, by only locally increasing the thickness, the overall weight of the outlet valve can be kept to a minimum.

In another embodiment the outlet valve further comprises a lever that is operable to move the outlet valve between the closed position and the open position. The lever can be operated manually or by an actuator. The actuator may be part of the hopper, or located externally to said hopper, for example at one of the packing positions of the dispensing device.

According to a second aspect, an outlet valve for use in a hopper outlet of a hopper is provided, wherein the outlet valve has a valve body that defines a holding surface at a side of the valve body that, in use, supports discrete medicaments in the hopper outlet when the outlet valve is in a closed position, wherein said holding surface has a cross section for receiving the discrete medicaments, wherein said cross section is trough-shaped.

The outlet valve corresponds to the outlet valve described above as part of the hopper and, as such, has the same technical advantages, which will not be repeated hereafter. The outlet valve may be retrofitted to a conventional hopper.

In one embodiment the valve body comprises a first half and a second half that converge in a drop direction from opposite sides of a mid-plane.

Optionally, the first half and the second half are symmetrical about said mid-plane.

In another embodiment the valve body further comprises a valley interconnecting the first half and the second half, wherein the valley extends linearly.

In another embodiment the cross section is at least partially V-shaped.

Alternatively, the cross section is at least partially concave.

In another embodiment in the cross section the holding surface has a width and a depth that is at least half the width.

In another embodiment the outlet valve is rotatable about a valve axis between the closed position and an open position, wherein the outlet valve at the location of the valve axis is provided with a reinforcement bushing.

Optionally, the reinforcement bushing has a thickness in an axial direction parallel to the valve axis that is thicker than valve body directly around said reinforcement bushing.

In a further embodiment the outlet valve further comprises a lever that is operable to move the outlet valve between the closed position and the open position.

According to a third aspect, use of an outlet valve according to any one of the embodiments of the second aspect of the invention is provided in a hopper for collecting and dispensing discrete medicaments.

According to a fourth aspect, a dispensing device is provided comprising the hopper according to any one of the embodiments of the first aspect, wherein the dispensing device further comprises a valve opener for moving the outlet valve from the closed position into the open position and a control unit operationally connected to the valve opener, wherein the control unit is configured for controlling the valve opener to accelerate the outlet valve from the closed position towards the open position quicker than the gravitational acceleration. Preferably, the outlet valve is accelerated with more than 9.81 $m/s^2$.

The holding surface can thus be dropped away from underneath the discrete medicaments faster than gravity, such that the discrete medicaments can be allowed to free fall from the moment the outlet valve starts to move from the closed position towards the open position. The discrete medicaments can thus fall vertically or substantially vertically into a chute of a packing unit underneath said hopper. In particular, it can be prevented that the outlet valve interferes with the trajectories of the discrete medicaments after the outlet valve starts to move from the closed position towards the open position.

According to a fifth aspect, a dispensing device is provided comprising the hopper according to any one of the embodiments of the first aspect of the invention, wherein the dispensing device comprises a valve position sensor for detecting the open position and/or the closed position of the outlet valve.

Detection of the open position and/or the closed position can provide insight into the correct operation and/or any faults occurring with the outlet valve during the operation. In particular, it can be detected when the outlet valve does not fully return to the closed position, for example because a discrete medicament is stuck between the outlet valve and the hopper outlet.

In an embodiment of the aforementioned dispensing device, wherein the valve position sensor comprises a transmitter and receiver at a first end of a detection area and a reflector at a second end of the detection area opposite to the first end, wherein the outlet valve in the closed position at least partially extends in the detection area and in the open position is clear of the detection area. By detecting a signal or an interruption of said signal, information about the current position of the outlet valve can be obtained.

Optionally, the transmitter is configured for emitting a beam in a horizontal detection direction. The valve position sensor can reliably detect the position of the outlet valve in said horizontal direction, without having to triangulate or interpolate. In particular, the valve position sensor can simply detect the presence or absence of the signal in said horizontal direction, indicative of the respective valve positions.

According to a sixth aspect, a method is provided for collecting and dispensing discrete medicaments with the use of a hopper according to any one of the embodiments of the first aspect of the invention, wherein the method comprises the steps of:

- positioning the outlet valve in the closed position to block passage of the discrete medicaments out of the hopper through the hopper outlet;
- supporting the discrete medicaments in the hopper outlet on the holding surface of the outlet valve; and
- moving the outlet valve from the closed position towards the open position to allow passage of the discrete medicaments out of the hopper through the hopper outlet.

The method relates to the practical implementation of the hopper according to the first aspect of the invention and thus has the same technical advantages, which will not be repeated hereafter.

In one embodiment of the method, during the movement of the outlet valve from the closed position towards the open position, the outlet valve is accelerated quicker than the gravitational acceleration.

Optionally, the outlet valve is accelerated with more than 9.81 $m/s^2$.

In a further embodiment the method further comprises the step of detecting the open position and/or the closed position of the outlet valve.

Optionally, the open position and/or the closed position are detected in a horizontal detection direction.

Further optionally, the step of detecting comprises detecting the position of a lever of the outlet valve. This can ensure that the sensor are out of the way of the movement of the valve itself and can accurately detect even small offsets from a fully closed position.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 2:
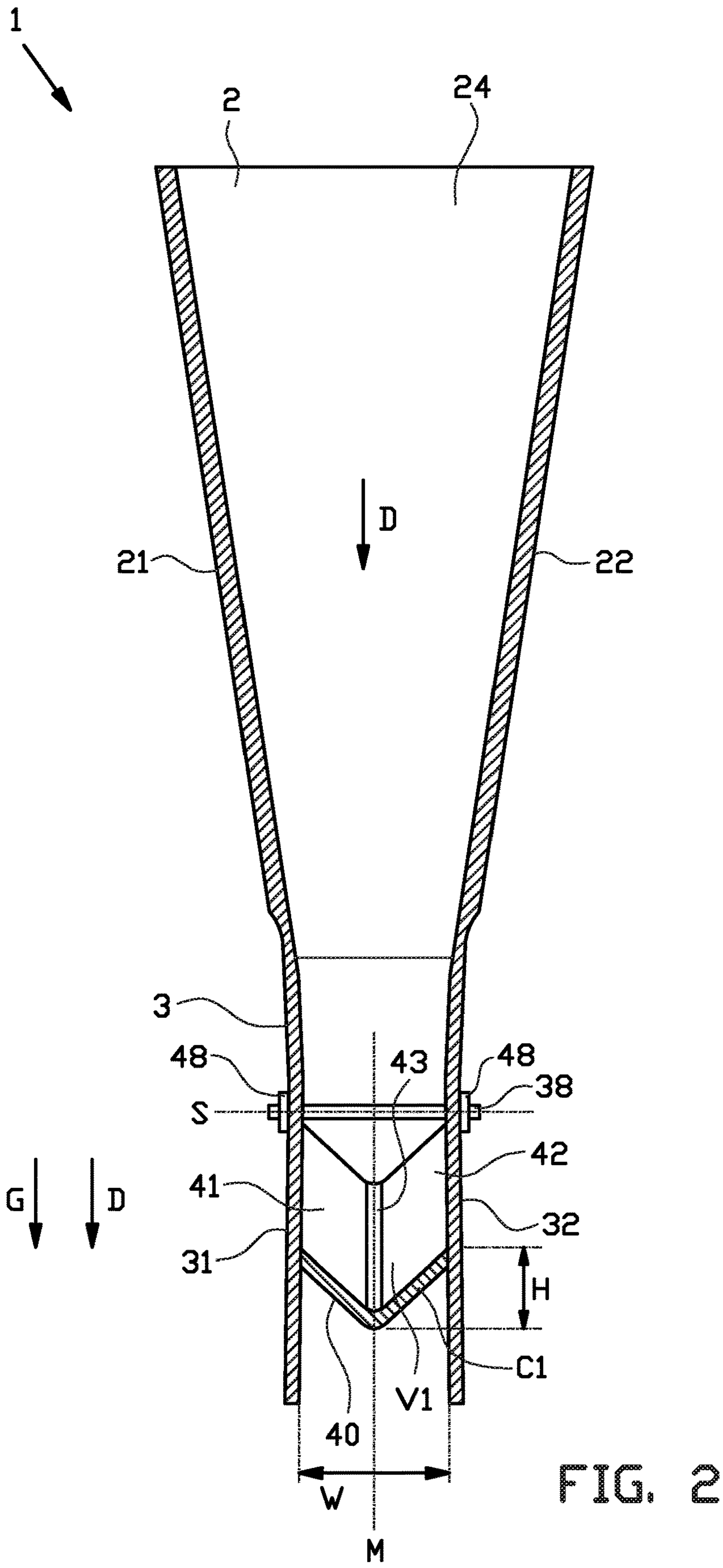
FIG. 2 shows a cross section of the hopper according to the line II-II in FIG. 1.
Figure 3:
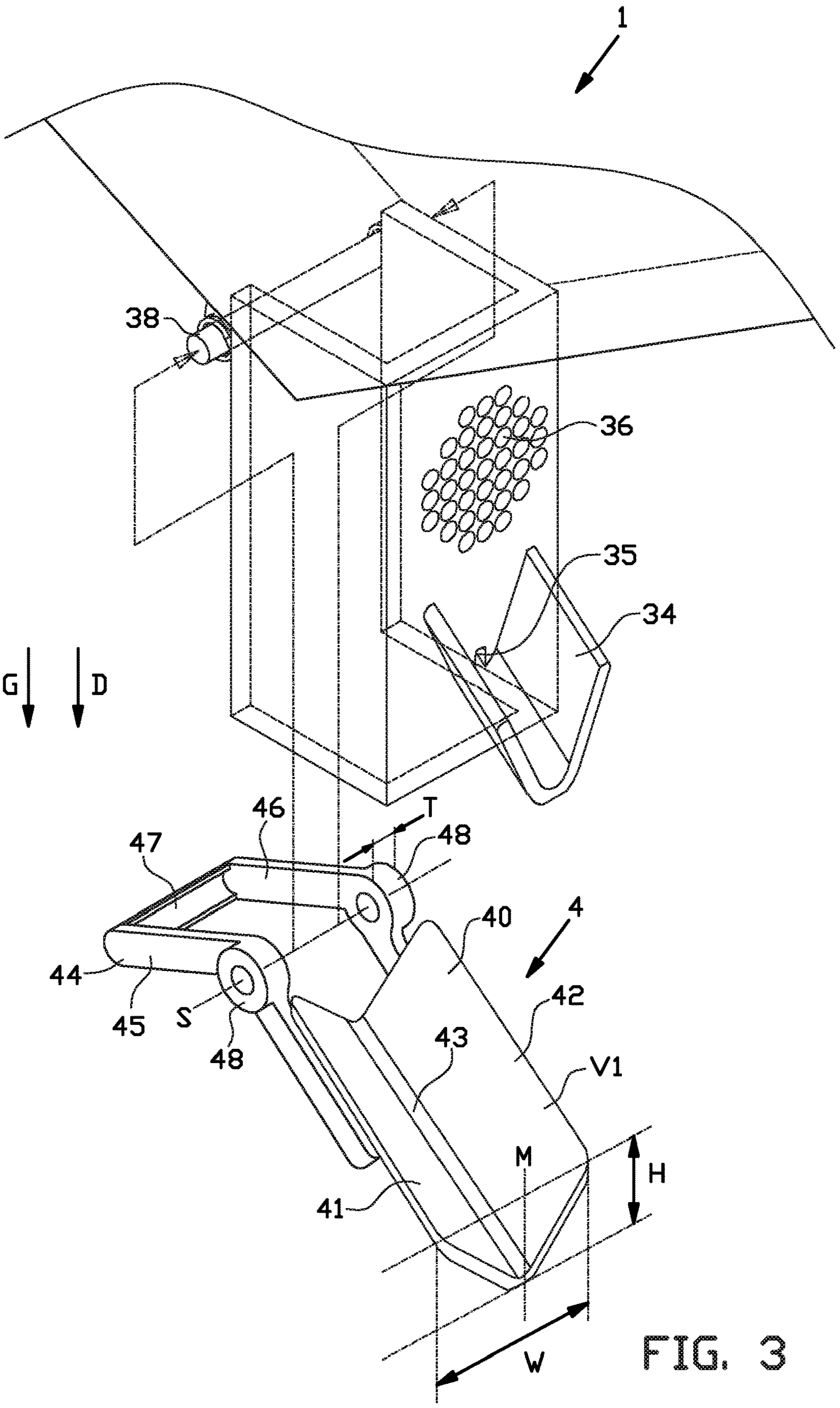
FIG. 3 shows an isometric view of the hopper with the outlet valve disassembled from the rest of the hopper.
Figure 4:
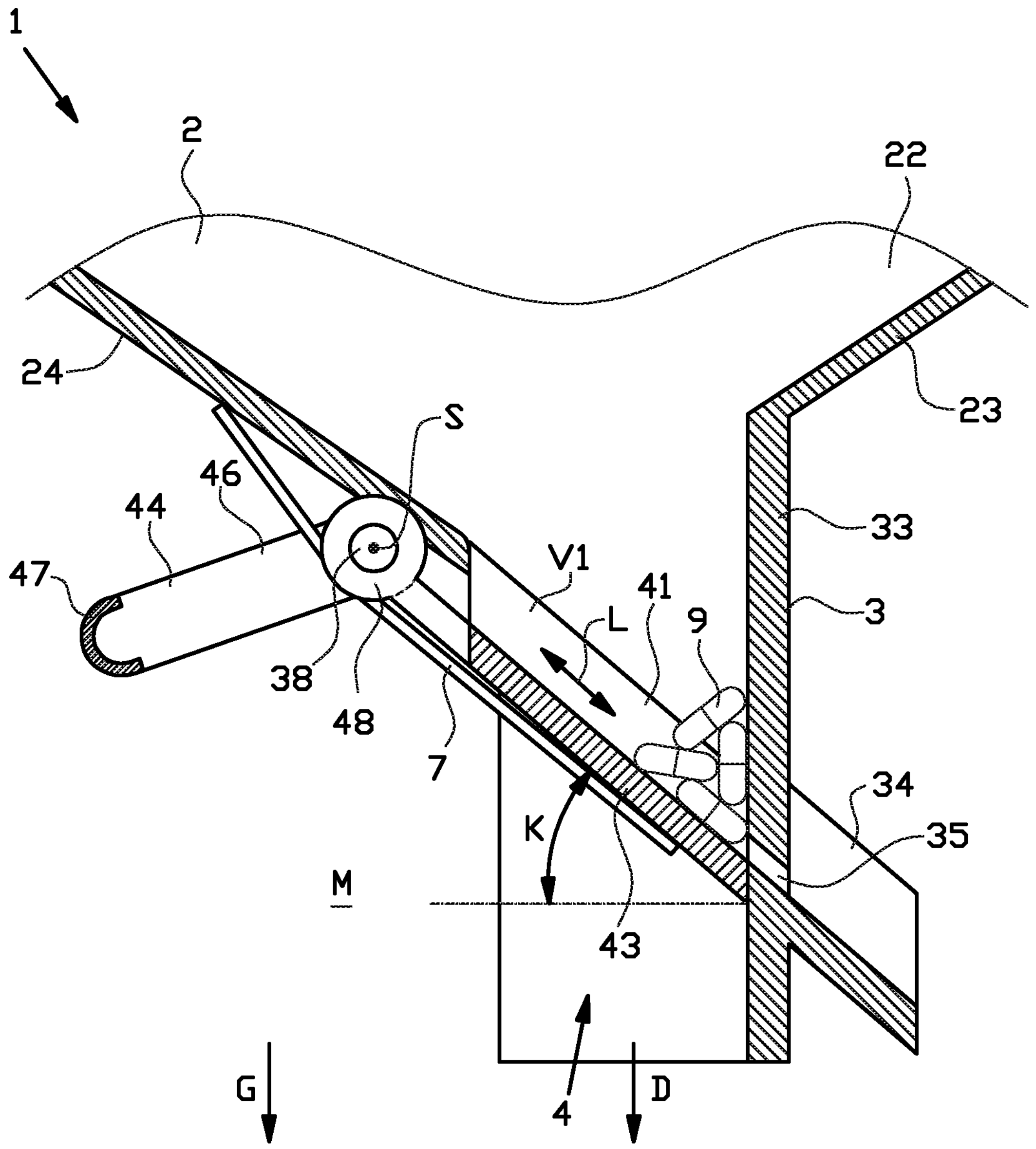
FIG. 4 shows a cross section of the hopper according to the line IV-IV in FIG. 1, with the outlet valve in a closed position.
Figure 5:
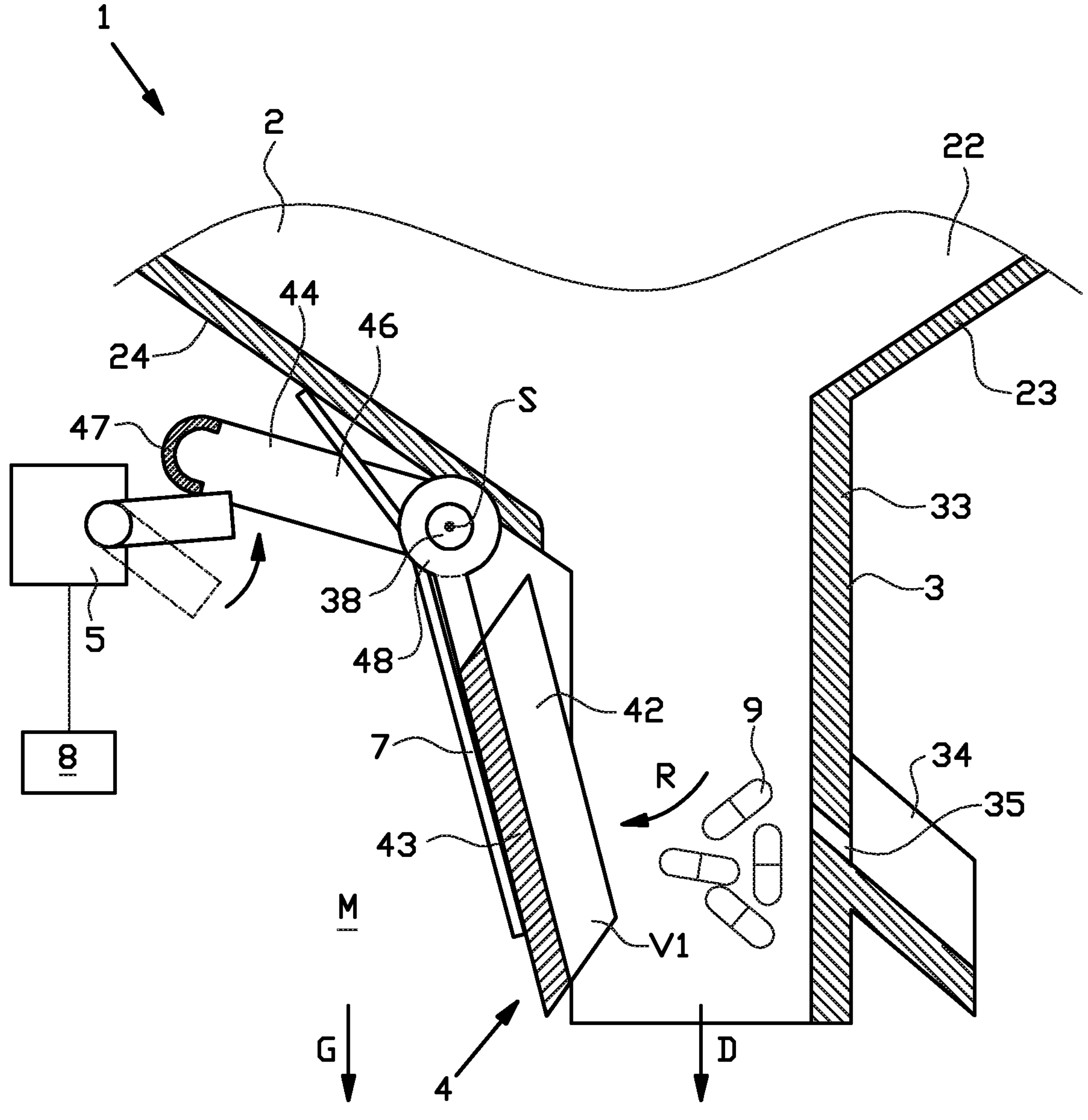
FIG. 5 shows a cross section of the hopper according to FIG. 4, with the outlet valve in an open position.

FIGS. 1-6 show a hopper 1 according to a first embodiment of the invention for collecting and dispensing discrete medicaments, discrete solid medicaments, pharmaceuticals or solid items, articles or substances 90 for medical use, e.g. pills, tablets, capsules or the like. The discrete medicaments 9 are shown in FIGS. 4 and 5 only. The medicaments are 'discrete' in the sense that they can be collected one-by-one, individually, separately or in dose units in the hopper 1.

The hopper 1 is configured to be insertable into a dispensing device similar to the apparatus disclosed in U.S. Pat. No. 10,457,427 B2, which is hereby incorporated by reference. In the dispensing device, the hopper 1 forms part of a circular array of hoppers that is moved in a stepped rotation along a plurality of feeder positions, to receive discrete medicaments from feeder units positioned in said feeder positions.

Figure 1:
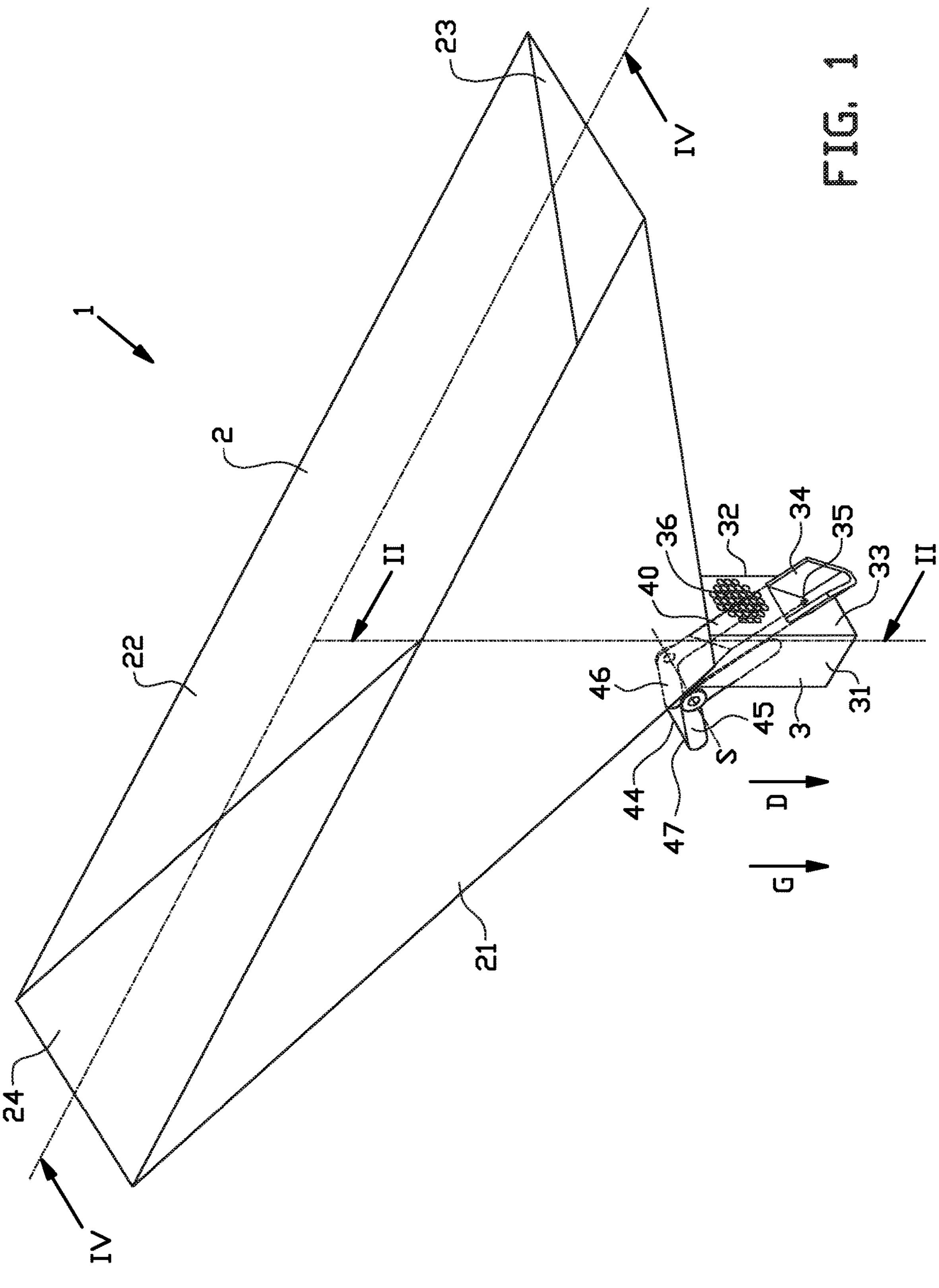
FIG. 1 shows an isometric view of a hopper according to a first exemplary embodiment of the invention with an outlet valve for dispensing discrete medicaments collected in said hopper.

As best seen in FIGS. 1 and 2, the hopper 1 comprises a hopper inlet 2 and a hopper outlet 3. The hopper inlet 2 is open at the top, relatively wide and tapers in a drop direction D towards the hopper outlet 3. In this exemplary embodiment, the drop direction D is vertical or substantially vertical. The hopper inlet 2 comprises two inlet side walls 21, 22. The hopper inlet 2 is further provided with an inlet rear wall 23 and an inlet front wall 24 tapering towards each other and interconnecting the two inlet side walls 21, 22. The inlet front wall 24 is facing to the outside of the circular array of hoppers when the hopper 1 is placed in the dispensing device. The front wall 24 may be provided with a handle or grip (not shown) to manually insert and/or take out the hopper 1 from the dispensing device.

The hopper outlet 3 is located at the tapering end of the hopper inlet 2 and is in open communication with said hopper inlet 2 to receive the discrete medicaments 9 collected by said hopper inlet 2. The hopper outlet 3 is open in the drop direction D to dispense or discharge the discrete medicaments 9 from the hopper 1. The hopper outlet 3 comprises two outlet side walls 31, 32 and an outlet rear wall 33 interconnecting the two outlet side walls 31, 32.

The hopper outlet 3 is further provided with a dust discharge channel 34 and a dust discharge opening 35 in the rear wall 33 allowing for the extraction of dust or small particles from the hopper outlet 3 through said rear wall 33.

The hopper outlet 3 also comprises a suction grating 36 for connection to a vacuum source that cleans the hopper 1.

In this exemplary embodiment, as shown in FIG. 2, the hopper outlet 3, and in fact the hopper 1 in its entirety, is symmetrical or substantially symmetrical about a mid-plane M, though this could be different in different hoppers.

Figure 6:
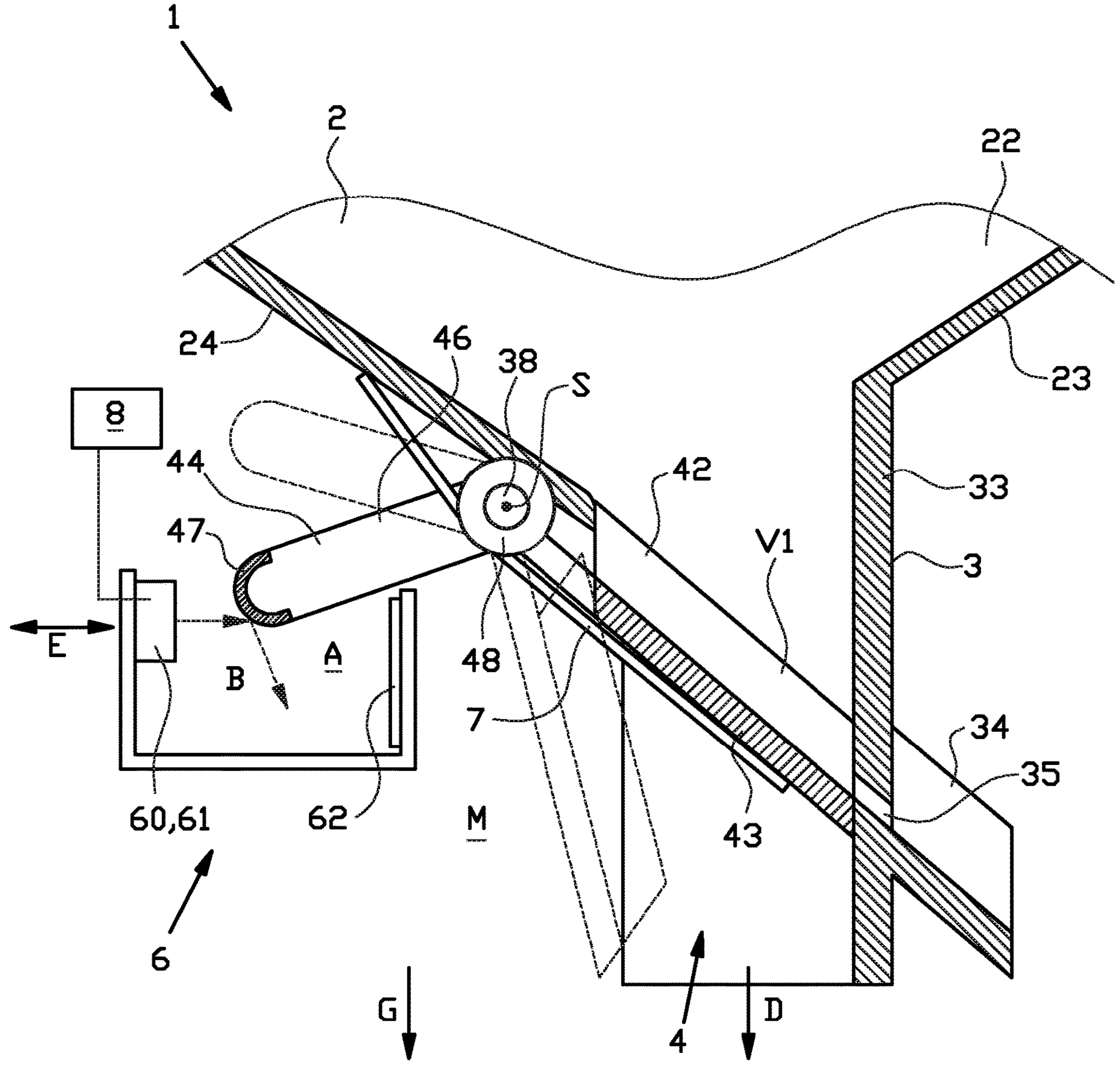
FIG. 6 shows a cross section of the hopper according to FIG. 4, with the outlet valve returned to the closed position.

The hopper 1 is further provided with an outlet door, shutter or valve 4 at or in the hopper outlet 3 to open or close said hopper outlet 3. In particular, the outlet valve 4 is movable between a closed position, as shown in FIGS. 4 and 6, in which the outlet valve 4 blocks passage of the discrete medicaments 9 out of the hopper 1 through the hopper outlet 3 and an open position, as shown in FIG. 5, in which the outlet valve 4 allows passage of the discrete medicaments 9 out of the hopper 1 through the hopper outlet 3 in the drop direction D. In this exemplary embodiment, the outlet valve 4 is rotatable about a valve axis S. The valve axis S extends perpendicular or substantially perpendicular to the mid-plane M.

As best seen in FIG. 3, the outlet valve 4 has a valve body 40 that defines a holding surface V1 at a side of the valve body 40 that supports the discrete medicaments 9 in the hopper outlet 4 when the outlet valve 4 is in the closed position. In other words, the holding surface V1 is the upwardly facing side of the valve body 40 when the outlet valve 4 is in the closed position.

As shown in FIG. 4, the valve body 40 is elongate in a longitudinal direction L. The holding surface V1 extends parallel to, substantially parallel to or in said longitudinal direction L. In the closed position of the outlet valve 4, the valve body 40 is arranged at an oblique angle K to the horizontal plane. In particular, the valve body 40 extends obliquely downwards towards the rear wall 33 of the hopper outlet 3.

FIG. 2 shows a cross section C1 of the valve body when the outlet valve 4 is in the closed position. The cross section C1 is taken in a plane parallel to the valve axis S. More in particular, in this example, the cross section C1 is taken in the vertical plane, parallel to the valve axis S. The cross section C1 may also have been taken in a plane perpendicular to the longitudinal direction L. The cross section C1 is trough-shaped. In the context of the present invention, the term 'trough-shaped' should be interpreted as a cross section that defines a recessed volume in the valve body 40 that is open in an upward direction to receive and support the discrete medicaments 9 in a recessed manner. In particular, the cross section C1 defines a long and narrow, channel-like volume in the longitudinal direction L of the valve body 40. The cross section C1 may be multifaceted, concave or a combination thereof.

In this exemplary embodiment, the cross section C1 is V-shaped or substantially V-shaped. In particular, the valve body 40 comprises a first half 41 and a second half 42 that converge in the drop direction D from opposite sides of the mid-plane M. The first half 41 and the second half 42 preferably extend at an angle to the mid-plane M that is relatively sharp, e.g. equal to or smaller than forty-five degrees. Note that the first half 41 and the second half 42 are symmetrical or substantially symmetrical about said mid-plane M.

As shown in FIG. 4, the valve body 40 further comprises a valley 43 interconnecting the first half 41 and the second half 42. Said valley 43 extends linearly, preferably in or parallel to the mid-plane M and/or parallel to the longitudinal direction L of the valve body 40. Note that the valley 43 is aligned with dust discharge opening 35 in the rear wall 33 and the dust discharge channel 34 on the opposite side of the rear wall 33 of the hopper outlet 3.

As best seen in FIG. 2, the holding surface V1 has a width W in a direction parallel to the valve axis S and a height or depth H in the drop direction D. The width W is chosen such that the valve body 40 fits neatly between the outlet side walls 31, 32. The depth H is typically chosen to be at least half the width W. Hence, the holding surface V1 is relatively deep compared to the width W.

As shown in FIG. 3, the hopper 1 is provided with a pin 38 to facilitate the rotation of the outlet valve 4 about the valve axis S. At the location of the pin 38, the outlet valve 4 is provided with a reinforcement ring or bushing 48 to receive and rotate about the pin 38. The reinforcement bushing 48 has a thickness T in an axial direction parallel to the pin 38 that is thicker than valve body 40 directly around said reinforcement bushing 48. In this exemplary embodiment, the thickness T of the reinforcement bushing 48 is approximately twice the thickness of the valve body 40 directly around said reinforcement bushing 48. The reinforcement bushing 48 is preferably integrally formed with the rest of the valve body 40.

As further shown in FIG. 3, the outlet valve 4 further comprises a lever 44 that is operable to move the outlet valve 4 between the closed position and the open position. The lever 44 comprises a first lever side 45 and a second lever side 46 extending mutually parallel at a side of the lever axis S opposite to the valve body 40. In this example, the lever sides 45, 46 are formed as arms. The lever 44 further comprises a lever end 47 interconnecting the lever sides 45, 46 at the distal end of said lever 44.

FIG. 5 shows the hopper 1 interacting with a valve opener 5 external to said hopper 1. The valve opener 5 may be part of the dispensing device in which the hopper 1 is placed. The valve opener 5 may comprise an actuator, for example a stepper motor, that interacts with the lever 44, more specifically the lever end 47, to open and close the outlet valve 4. The valve opener 5 is strategically positioned at a dispensing position, in particular at a packing unit, to operate the outlet valve 4 when the hopper 1 is almost or directly above said packing unit. The dispensing device further comprises a control unit 8 that is operationally and/or electronically connected to the valve opener 5 to control said valve opener 5.

The control unit 8 is programmed, arranged and/or configured for controlling the valve opener 5 to accelerate the outlet valve 4 from the closed position, as shown in FIG. 4, towards the open position, as shown in FIG. 5 with rotation arrow R, quicker than the gravitational acceleration, i.e. more than 9.81 $m/s^2$. As a result, the holding surface V1 can be dropped or pulled away from underneath the discrete medicaments 9 faster than gravity, to ensure that the discrete medicaments 9 can free fall from the hopper outlet 3. In other embodiments, the outlet valve 4 could be moved more slowly such that the outlet valve 4 helps to guide and/or slow the fall.

As shown in FIG. 6, the hopper 1 is further provided with a return member 7, preferably a biasing element such as a spring, to return the outlet valve 4 to the closed position once the valve opener 5 releases the outlet valve 4 from the open position. This may for example happen when the circular array of hoppers is rotated over another step and the hopper 1, which was previously positioned directly overhead the packing position and at the valve opener 5 associated with said packing position, is now moved away from the valve opener 5 into a subsequent position downstream of the packing position.

In said subsequent position, the dispensing device may further be provided with a valve position sensor 6 to check if the outlet valve 4 has been returned correctly to the closed position. The outlet valve 4 may not return correctly when something is stuck between the outlet valve 4 and the hopper 1, for example a discrete medicament 9 or a part of a medicament that failed to fall out of the hopper outlet 3 in time. The valve position sensor 6 comprises a transmitter 60 and receiver 61 at a first end of a detection area A and a reflector 62 at a second end of the detection area A opposite to the first end. The transmitter 60 may be configured to emit a light beam B, for example infrared or laser light. The receiver 61 may be photocell sensitive to the spectrum of the light beam B.

In the open position, shown in dashed lines in FIG. 6, the outlet valve 4 extends clear of the detection area A. In that case, the light beam B may travel interrupted from the transmitter 60 to the reflector 62 and back towards the receiver 61. However, in the closed position, shown in solid lines in FIG. 6, the outlet valve 4 at least partially extends in the detection area A. The outlet valve 4, and in particular the lever 44 thereof, intersects with the light beam B and deflects the light beam B away from the reflector 62. Hence, no signal is detected, which is indicative of the outlet valve 4 correctly being returned to the closed position.

The operation of the valve position sensor 6 may alternatively be reversed, e.g. by positioning the transmitter 60, the reflector 61 and the receiver 62 such that a signal is detected when the outlet valve 4 is completely closed and no signal is detected when the outlet valve 4 is at least partially open.

The transmitter 60 and the reflector 62 are positioned such that even a slight offset of the outlet valve 4 from the closed position will cause the lever 44 to move at least partially out of the path of the light beam B. Hence, a signal is detected when the outlet valve 4 is not completely closed. Optionally, the detection direction E is horizontal or substantially horizontal. In other words, the light beam B is emitted and reflected horizontally or substantially horizontally.

The control unit 8 is operationally and/or electronically connected to the valve position sensor 6 to receive and process the signal (or absence thereof) generated by said valve position sensor 6, and to take appropriate action, for example stop the dispensing operation and/or alert an operator.

Figure 7:
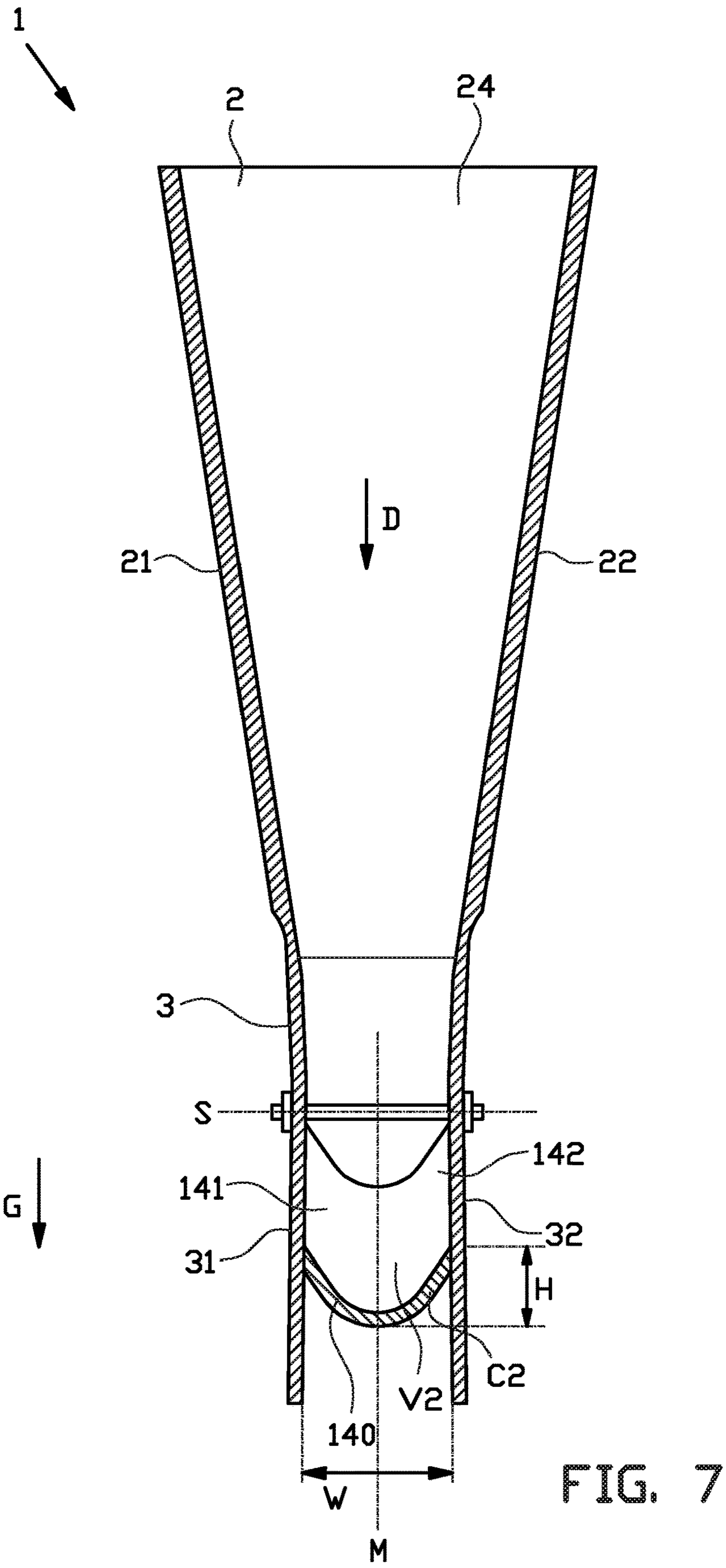
FIG. 7 shows cross section of an alternative hopper according to a second exemplary embodiment of the invention.

FIG. 7 shows an alternative hopper 101 according to a second embodiment of the invention, which differs from the previously discussed hopper 1 in that its outlet valve 104 has an valve body 140 that defines an alternative holding surface V2 with a concave cross section C2. In particular, the two halves 141, 142 of the valve body 140 are arcuate and converge or taper towards each other from opposite sides of the mid-plane M. Like its V-shaped counterpart, the concave holding surface V2 is symmetrical about said mid-plane M. Again, it has a depth H that is at least equal to half the width W. Hence, the alternative holding surface V2 is equally well suited to receive discrete medicaments 9 in a recessed manner.

Figure 8:
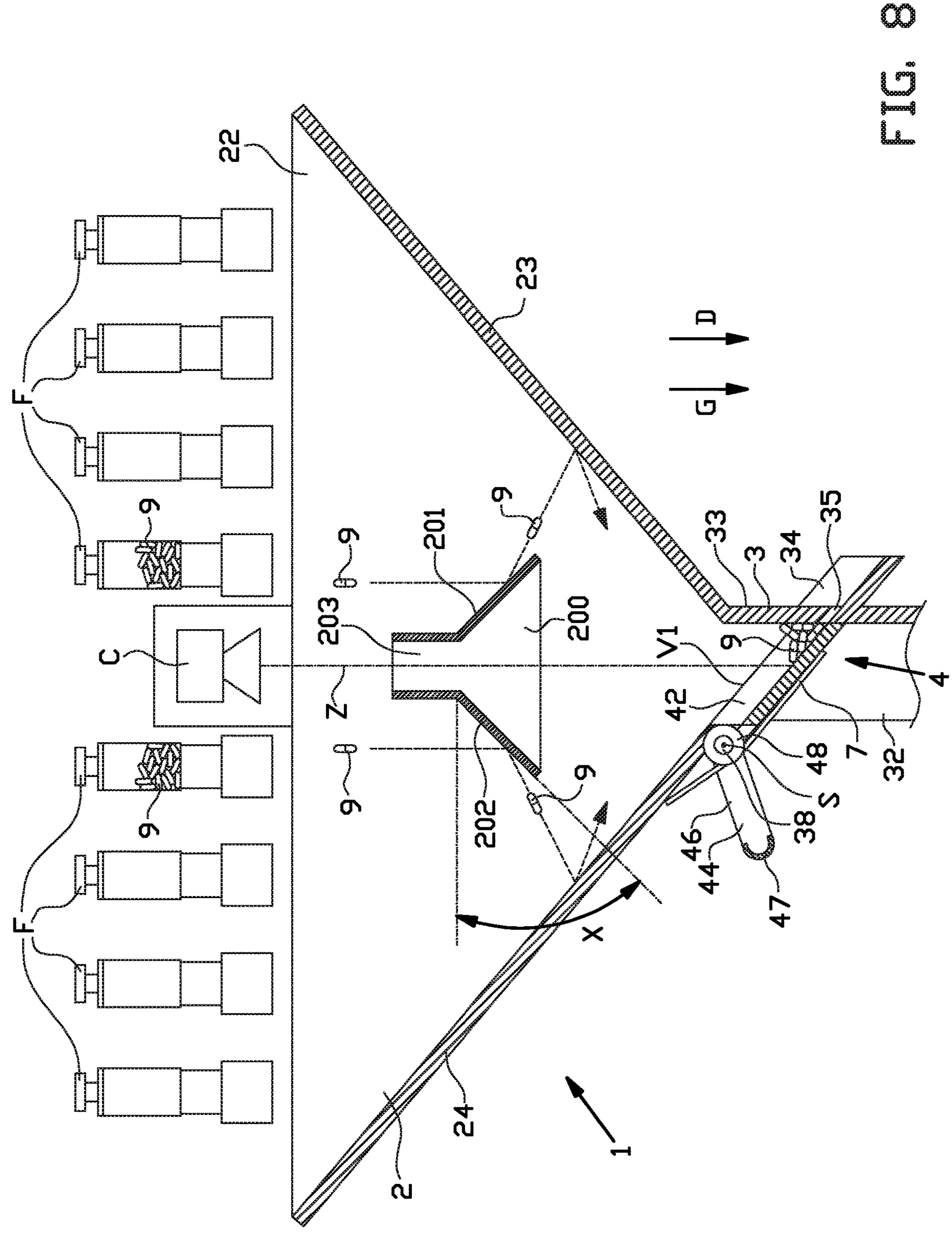
FIG. 8 shows a cross section of the hopper according to FIG. 4, and further showing a plurality of feeder units and a camera above said hopper.

FIG. 8 shows the aforementioned hopper 1 in relation to the feeder units F above it. The feeder units F can individually and/or selectively feed discrete medicaments 9 into the hopper inlet 2. The hopper 1 is optionally provided with a deflection member 200 in the hopper inlet 2 that can deflect the discrete medicaments 9 in a central region of the hopper inlet 2 to optimize their respective falling trajectories through the hopper inlet 2. In this way, it can be prevented that some of the discrete medicaments 9 travel a longer trajectory than others. In particular, the shape of the deflection member 3 is optimized to ensure that all discrete medicaments 9, regardless of the position of the feeder unit F from which they originated, reach the hopper outlet 3 at substantially the same time. Optionally, the deflection member 200 is removable from the hopper inlet 2 to facilitate easy cleaning and stacking of both the hopper inlet 2 and the deflection member 200.

The deflection member 200 comprises a first deflection surface 201 and a second deflection surface 202 extending at an oblique deflection angle X to the horizontal plane. The deflection angle X is chosen in a range of thirty to sixty degrees, more particularly a range of forty to fifty degrees. In this example, the deflection angle X is approximately forty-five degrees. The deflection surfaces 201, 202 are oppositely angled away from the center of the hopper inlet 2, like an inverted V-shape. In this example, the deflection surfaces 201, 202 are part of a single body. Alternatively, the deflection member 200 may be formed by two or more separate parts, each having its own deflection surface 201, 202. The deflection surfaces 201, 202 can break the fall of the discrete medicaments 9. The oblique deflection angle X can minimize or prevent damage to said discrete medicaments 9.

The deflection member 200 is further provided with a through-hole 203 that provides a clear line of sight Z between a camera C, located above the hopper 1, to the outlet valve 4. In this example, the line of sight Z is vertical or substantially vertical. In other words, the camera C is aligned vertically above the outlet valve 4. In this example, the through-hole 203 is located between the deflection surfaces 201, 202. Optionally, the dimensions of the through-hole 203 are chosen to be larger than, match or substantially match the field of view of the camera C. The camera C can be used to determine if the outlet valve 4 has been opened or closed correctly, or to determine if there are any discrete medicaments 9 or other materials remaining in the hopper outlet 3.

The camera C may be arranged in a dedicated camera position between the feeder units F, or it may be configured to be inserted into one of the positions normally occupied by a feeder unit F. In particular, the camera C may be adapted to fit to a docking base for such a feeder unit F, with the line of sight travelling through the aperture that is normally used to feed the discrete medicaments 9 from the respective feeder unit F into the hopper 1. Alternatively, the camera C can be positioned below the hopper outlet 3 with its line of sight pointing upwards. In that case, a backlight can be provided at the top of the hopper 1.

A method for collecting and dispensing discrete medicaments 9 with the use of any one of the aforementioned hoppers 1, 101 will now be briefly elucidated with reference to FIGS. 4-6.

FIG. 4 shows the situation in which the outlet valve 4 is positioned in the closed position to block passage of the discrete medicaments 9 out of the hopper 1 through the hopper outlet 3. A plurality of discrete medicaments 9 is supported on the holding surface V1. In particular, because of the trough-shaped cross section C1, as shown in FIG. 2, the holding surface V1 has been able to receive a plurality of the discrete medicaments 9 in a closely packed or nested manner, thereby reducing the chances of said discrete medicaments 9 bouncing off and damaging each other.

FIG. 5 shows the situation after the outlet valve 4 has been moved from the closed position towards the open position to allow passage of the discrete medicaments 9 out of the hopper 1, 101 through the hopper outlet 3. As mentioned before, the outlet valve 4 is accelerated quicker than the gravitational acceleration. In this way, it can be prevented that the outlet valve 4 interferes with the trajectories of the discrete medicaments 9 after the outlet valve 4 starts to move from the closed position towards the open position. As can be observed in FIG. 5, the group of discrete medicaments 9 previously supported on the holding surface V1 have started their free fall while remaining in relatively close proximity to each other, similar to their original relative positions on the holding surface V1. With little to no relative movement between the discrete medicaments 9, trajectory altering contacts between the discrete medicaments 9 can be prevented as much as possible.

FIG. 6 shows the situation after the outlet valve 4 has been returned to the closed position, with the valve position sensor 6 detecting said correct closing in the way as previously described.

It is to be understood that the above description is included to illustrate the operation of the preferred embodiments and is not meant to limit the scope of the invention. From the above discussion, many variations will be apparent to one skilled in the art that would yet be encompassed by the spirit and the scope of the present invention.

LIST OF REFERENCE NUMERALS

1 hopper
2 hopper inlet
21 inlet sidewall
22 inlet sidewall
23 inlet rear wall
24 inlet front wall
3 hopper outlet
31 outlet sidewall
32 outlet sidewall
33 outlet rear wall
34 dust discharge channel
35 dust discharge opening
36 suction grating
38 pin
4 outlet valve
40 valve body
41 first half
42 second half
43 valley
44 lever
45 first lever side
46 second lever side
47 lever end
48 reinforcement bushing
5 valve opener
6 valve position sensor
60 transmitter
61 receiver
62 reflector
7 return member
8 control unit
9 discrete medicament
101 alternative hopper
104 outlet valve
140 valve body
141 first half
142 second half
200 deflection member
201 first deflection surface
202 second deflection surface
203 through hole
A detection area
B beam
C camera
C1 cross section
C2 alternative cross section
D drop direction
E detection direction
F feeder unit
G gravity
H depth
K oblique angle
L longitudinal direction
M mid-plane
R rotation
S valve axis
T thickness
V1 holding surface
V2 alternative holding surface
W width
X deflection angle
Z line of sight

The invention claimed is:

1. Hopper for collecting and dispensing discrete medicaments, wherein the hopper comprises:
a hopper inlet,
a hopper outlet, and
an outlet valve in the hopper outlet that is movable between a closed position in which the outlet valve blocks passage of the discrete medicaments out of the hopper through the hopper outlet and an open position in which the outlet valve (4, 104) allows passage of the discrete medicaments out of the hopper through the hopper outlet in a drop direction, wherein the outlet valve has a lever, that is operable to move the outlet valve between the closed position and the open position, and valve body that defines a holding surface at a side of the valve body that supports the discrete medicaments in the hopper outlet when the outlet valve is in the closed position, wherein said holding surface has a cross section for receiving the discrete medicaments, wherein said cross section is trough-shaped, wherein the hopper further comprises a valve position sensor for detecting the open position and/or the closed position of the outlet valve, based on the position of the lever, wherein the valve position sensor comprises a transmitter and a receiver at a first end of a detection area (A), wherein the outlet valve lever in the closed position at least partially extends into the detection area (A) to intersect with a light beam from the transmitter and deflect the light beam, and in the open position is clear of the detection area, and wherein the valve position sensor is configured for detecting when the outlet valve does not fully return to the closed position because at least part of a discrete medicament is stuck between the outlet valve and the hopper outlet.

2. Hopper according to claim 1, wherein the outlet valve is rotatable between the closed position and the open position about a valve axis(S), wherein the cross section is parallel to the valve axis(S).

3. Hopper according to claim 1, wherein the valve body comprises a first half and a second half that converge in the drop direction (D) from opposite sides of a mid-plane (M).

4. Hopper according to claim 3, wherein the outlet valve is rotatable between the closed position and the open position about a valve axis(S), wherein the mid-plane (M) extends perpendicular to the valve axis(S).

5. Hopper according to claim 1, wherein the transmitter emits a laser light.

6. Hopper according to claim 5, wherein the transmitter is configured for emitting a beam (B) in a horizontal detection direction (E).

7. Hopper according to claim 1, wherein the cross section (C2) is at least partially concave.

8. Hopper according to claim 1, wherein in the cross section the holding surface has a width (W) and a height (H) that is at least half the width (W).

9. Hopper according to claim 1, wherein the holding surface has a longitudinal direction (L) that is at an oblique angle (K) to the horizontal plane when the outlet valve is in the closed position.

10. Hopper according to claim 1, wherein the hopper is provided with a pin, wherein the outlet valve is rotatable about said pin between the closed position and the open position, wherein the outlet valve at the location of the pin is provided with a reinforcement bushing to receive the pin.

11. Hopper according to claim 10, wherein the reinforcement bushing has a thickness (T) in an axial direction parallel to the pin that is thicker than valve body directly around said reinforcement bushing.

12. Method for collecting and dispensing discrete medicaments with the use of a hopper according to claim 1, wherein the method comprises the steps of:
- positioning the outlet valve in the closed position to block passage of the discrete medicaments out of the hopper through the hopper outlet;
- supporting the discrete medicaments in the hopper outlet on the holding surface of the outlet valve; and
- moving the outlet valve from the closed position towards the open position to allow passage of the discrete medicaments out of the hopper through the hopper outlet.

13. Method according to claim 12, wherein during the movement of the outlet valve from the closed position towards the open position, the outlet valve is accelerated quicker than the gravitational acceleration.

14. Method according to claim 12, wherein the method further comprises the step of detecting the open position and/or the closed position of the outlet valve by detecting the position of the lever of the outlet valve.

15. Method according to claim 12, wherein the open position and/or the closed position are detected in a horizontal detection direction (E).

16. Dispensing device comprising a hopper for collecting and dispensing discrete medicaments,
wherein the hopper comprises:
- a hopper inlet,
- a hopper outlet, and
- an outlet valve in the hopper outlet that is movable between a closed position in which the outlet valve blocks passage of the discrete medicaments out of the hopper through the hopper outlet and an open position in which the outlet valve allows passage of the discrete medicaments out of the hopper through the hopper outlet in a drop direction, wherein the outlet valve has a valve body that defines a holding surface at a side of the valve body that supports the discrete medicaments in the hopper outlet when the outlet valve is in the closed position,
wherein said holding surface has a cross section for receiving the discrete medicaments,
wherein said cross section is trough-shaped,
wherein the dispensing device further comprises a valve opener for moving the outlet valve from the closed position into the open position and a control unit operationally connected to the valve opener,
wherein the control unit is configured for controlling the valve opener to accelerate the outlet valve from the closed position towards the open position quicker than the gravitational acceleration,
wherein the dispensing device further comprises a valve position sensor for detecting the open position and/or the closed position of the outlet valve, and wherein the valve position sensor is further configured for detecting when the outlet valve does not fully return to the closed position because at least part of a discrete medicament is stuck between the outlet valve and the hopper outlet.

17. Dispensing device according to claim 16, wherein the valve position sensor comprises a transmitter and a receiver at a first end of a detection area (A) and a reflector at a second end of the detection area (A) opposite to the first end, wherein the outlet valve in the closed position at least partially extends in the detection area (A) and in the open position is clear of the detection area (A).

18. Dispensing device according to claim 17, wherein the transmitter is configured for emitting a beam (B) in a horizontal detection direction (E).

19. Dispensing device according to claim 16, wherein the outlet valve further comprises a lever that is operable to move the outlet valve between the closed position and the open position and the position sensor detects whether the outlet valve is in the open position or the closed position based on the position of the lever.

* * * * *